United States Patent
Chen

(10) Patent No.: US 7,916,075 B2
(45) Date of Patent: Mar. 29, 2011

(54) SATELLITE SIGNAL ADAPTIVE TIME-DIVISION MULTIPLEXING RECEIVING DEVICE

(75) Inventor: Chun-nan Chen, Taipei (TW)

(73) Assignee: MEDIATEK Inc., Hsin-Chu (TW)

( * ) Notice: Subject to any disclaimer, the term of this patent is extended or adjusted under 35 U.S.C. 154(b) by 269 days.

(21) Appl. No.: 11/775,114

(22) Filed: Jul. 9, 2007

(65) Prior Publication Data

US 2008/0013518 A1 Jan. 17, 2008

Related U.S. Application Data

(63) Continuation-in-part of application No. 11/406,644, filed on Apr. 19, 2006, now Pat. No. 7,474,260.

(51) Int. Cl.
*G01S 19/24* (2010.01)
*G01S 19/37* (2010.01)

(52) U.S. Cl. ............................... 342/357.63; 342/357.77

(58) Field of Classification Search ............. 342/357.63, 342/357.77
See application file for complete search history.

(56) References Cited

U.S. PATENT DOCUMENTS

| | | | | |
|---|---|---|---|---|
| 5,592,173 | A * | 1/1997 | Lau et al. | 342/357.12 |
| 5,650,785 | A * | 7/1997 | Rodal | 342/357.12 |
| 6,016,121 | A * | 1/2000 | Bogensberger et al. | 342/357.12 |
| 6,504,816 | B1 | 1/2003 | Lee et al. | |
| 6,657,986 | B1 * | 12/2003 | Laudel et al. | 370/342 |
| 6,735,523 | B1 | 5/2004 | Lin et al. | |
| 6,748,015 | B2 * | 6/2004 | Kohli et al. | 375/150 |
| 6,836,241 | B2 * | 12/2004 | Stone et al. | 342/357.15 |
| 7,023,905 | B2 | 4/2006 | Farine et al. | |
| 7,221,913 | B2 | 5/2007 | Golden et al. | |
| 7,333,053 | B2 * | 2/2008 | Lawrence et al. | 342/357.04 |
| 7,453,396 | B2 * | 11/2008 | Levin et al. | 342/357.1 |
| 7,453,926 | B2 | 11/2008 | Chen et al. | |
| 7,460,615 | B2 * | 12/2008 | Kunysz et al. | 375/316 |
| 2003/0174792 | A1 | 9/2003 | Bow et al. | |
| 2007/0085736 | A1 * | 4/2007 | Ray et al. | 342/357.02 |

FOREIGN PATENT DOCUMENTS

| | | |
|---|---|---|
| EP | 1387500 | 2/2004 |
| WO | 02/25829 | 3/2002 |
| WO | 02/46787 | 6/2002 |
| WO | 03017503 A2 | 2/2003 |

\* cited by examiner

*Primary Examiner* — Gregory C Issing

(57) ABSTRACT

A satellite signal adaptive time-division multiplexing receiving device is disclosed. The receiving device operates in time-division multiplexing distributed for various domains such as satellite number, Doppler frequency, code phase and accuracy. When some specific time slots of the time-division multiplexing distribution are unnecessary to be searched, the receiving device uses a disable signal to deactivate specific components such as correlator and memory thereof during those time slots to reduce power consumption.

15 Claims, 7 Drawing Sheets

FIG. 2

SATELLITE SIGNAL ADAPTIVE TIME-DIVISION MULTIPLEXING RECEIVING DEVICE

CROSS-REFERENCE TO RELATED APPLICATIONS

The present application is a continuation-in-part of U.S. patent application Ser. No. 11/406,644, entitled "SATELLITE SIGNAL ADAPTIVE TIME-DIVISION MULTIPLEXING RECEIVING DEVICE AND METHOD USED IN THE SAME", filed on Apr. 19, 2006.

TECHNICAL FIELD OF THE INVENTION

The present invention relates to satellite signal receiver, more particularly, to an adaptive time-division multiplexing receiving device for satellite communication in GNSS or any other suitable systems.

BACKGROUND OF THE INVENTION

For a receiver detecting data loaded in spread spectrum signal transmitted in a GNSS (Global Navigation Satellite System; such as GPS, GLONASS, GALILEO system and the like), there are three domains should be considered: visible satellite ID, Doppler frequency, and code phase. In a cold start state, such as in the beginning when the receiver starts to work, the visible satellite ID, the recent Doppler frequency and the code phase are all unknown. Accordingly, it is necessary to try each possible combination of these three domains. One combination of a specific satellite ID, a specific Doppler frequency, and a specific code phase is referred to a "hypothesis". For a satellite SVx, if there are M possible Doppler frequencies DF0, DF1, . . . DFm−1, and N code phases CP0, CP1, . . . . CPn−1 to be tried, then there are M×N hypotheses, as shown in FIG. 1. As can be deduced, when there are X satellites SV0, SV1, . . . , SVx−1, the total number of hypotheses will be X×M×N, as shown in FIG. 2. In the worst case, X×M×N correlation trials should be done to acquire a specific GPS signal. In some applications, half or one fourth chip code spacing is necessary to achieve higher tracking accuracy. Therefore, an extra factor P is introduced. When the chip code spacing is half chip, P=2; when the chip code spacing is one fourth chip, P=4. The rest can be deduced accordingly. Then the total hypothesis number is X×M×N×P.

The most intuitive method is to try all the hypotheses one by one if only one correlator is available in the receiver. If two correlators are available, then two hypotheses can be tried at the same time. Accordingly, the speed can be double. As can be understood, if the speed is to be considerably lifted, a great number of correlators are needed. This causes increases in cost and hardware complexity.

For a GPS signal, the chipping rate of pseudo-random code is 1.023 MHz, and the period thereof is 1023 chips, which is 1 millisecond. Therefore, a correlator having 1023 pairs of a multiplier and an adder is needed to correlate the received signal if the clock rate of the correlator is only 1 kHz. The searching rate is one hypothesis per millisecond. However, such a correlator, which has 1023 pairs of a multiplier and an adder, is too complex and the clock rate of 1 kHz is too slow in practice. The scale of the correlator can be reduced by increasing the clock rate to achieve the same effect. For example, if 33 kHz clock rate is used, than only 31 pairs of a multiplier and an adder are required.

As described above, the hardware complexity can be reduced by increasing the clock rate, but the hypothesis searching rate is still one hypothesis per millisecond. There are 1023 hypotheses in code phase domain for a specific satellite and a specific Doppler frequency. If the clock rate is further raised to 33 kHz×1023=33.759 MHz, then all code phase hypotheses for the satellite and the specific Doppler frequency can be tried in one millisecond. In some applications, higher accuracy is required, so that half chip spacing, for example, is necessary. Then there are 2046 hypotheses are to be tried in the code phase domain for a specific satellite and a specific Doppler frequency. Accordingly, the clock rate can be further raised to 33.759 MHz×2=67.518 MHz, and 2046 hypotheses are tried in one millisecond. As the clock rate increasing, additional memory capacity is required. However, this is not a big problem because memory is low-cost in comparison with multiplier or adder. In addition to increasing clock rate, it is necessary to properly arrange multiplexing of the searching capability for the respective domains so as to be adapted to various application conditions.

SUMMARY OF THE INVENTION

The present invention is to provide a satellite signal adaptive time-division multiplexing receiving device. The receiving device comprises general components such as a correlator and memory. The receiving device operates in time-division multiplexing (TDM) which is distributed according to requirements for domains such as satellite number, Doppler frequency, code phase and accuracy. In accordance with the present invention, the receiving device generates a disable signal based on application condition so as to deactivate some specific components such as correlator and memory during specific TDM time slots. Therefore, power consumption can be reduced.

BRIEF DESCRIPTION OF THE DRAWINGS

Figure 2:
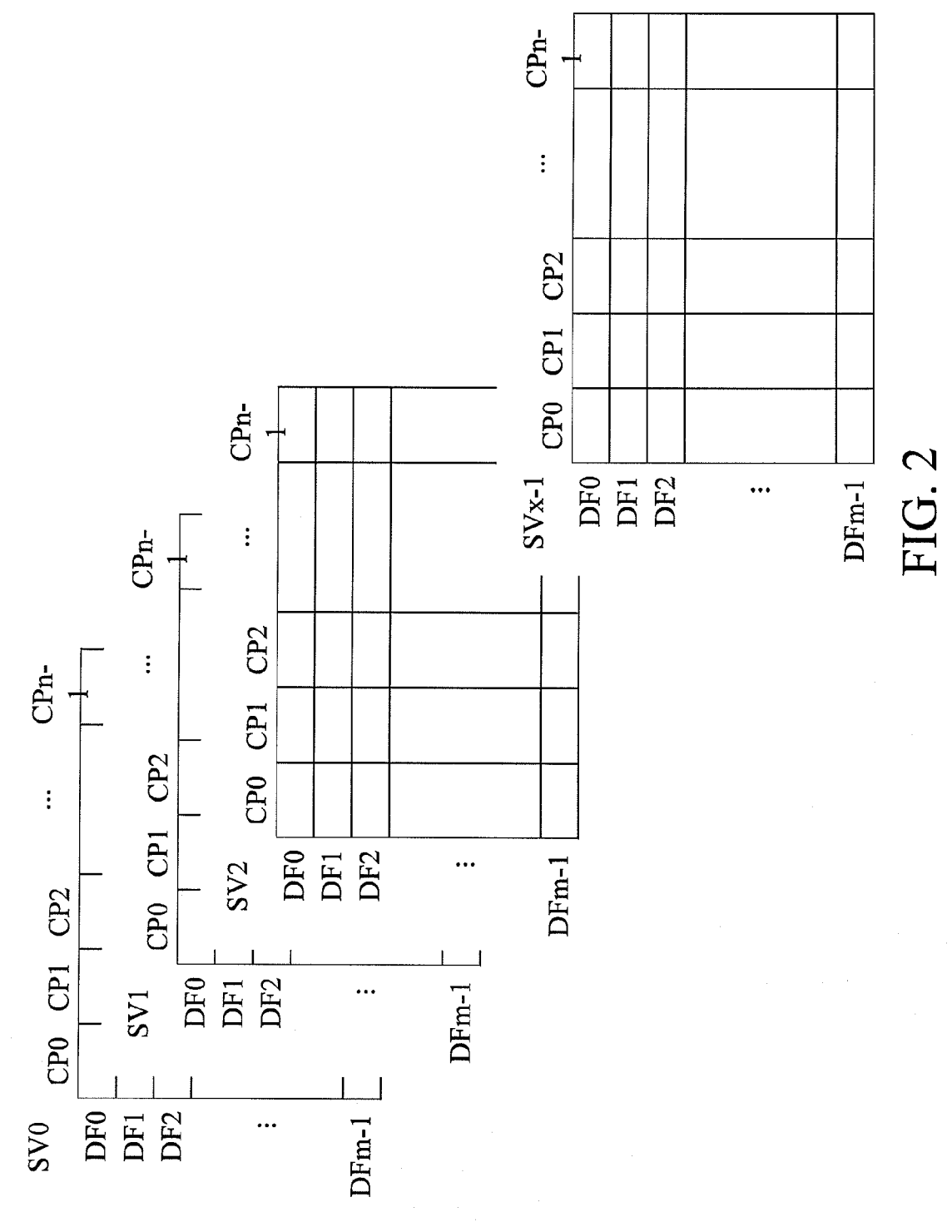

FIG. 2 schematically shows hypotheses in code phase domain and Doppler frequency domain for available satellites.

DETAILED DESCRIPTION OF THE INVENTION

The present invention will be described in detail in conjunction with the appending drawings. As described, total hypothesis trial number for a time-division multiplexing receiver is X×M×N×P. Suppose that a clock rate is K multiples of the hardware multiplexing rate, (e.g. 33 kHz for the correlator has 31 pairs of multiplier and adder). An equation of multiplexing is as follows:

$$K >= X \times M \times N \times P \qquad (1)$$

Where M is the hypotheses number to be tried in Doppler frequency domain, N is the hypotheses number to be tried in code phase domain. P indicates the accuracy can be achieved.

As mentioned, P=2 indicates that the accuracy is ½ chip, P=4 indicates that the accuracy is ¼ chip. X indicates the satellite number can be tried.

In one case, K can be fixed. The time-division multiplexing of the receiver for trying the hypotheses is adaptively arranged based on the fix clock rate. For example, if K=2046, which means 2046 hypotheses are tried in one millisecond. The multiplexing for K could be distributed as 1×1×1023×2. That is, in one millisecond, 1023 code phase hypotheses for a specific satellite and a specific Doppler frequency are tried with an accuracy of ½ chip. In some cases, the code phase range is known. Therefore, it is not necessary to try all the hypotheses in the code phase domain. Accordingly, the multiplexing of K can be 1×3×341×2. That is, in one millisecond, 682 half-chip code phase trials at three different Doppler frequencies for a specific satellite are done.

After the satellite signal is acquired, and the process enters signal tracking. In this condition, the code phase is locked. At this time, it does not need to search so many code phase hypotheses. Then the multiplexing of K can be 11×3×15×4. That is, in one millisecond, 11 satellites are searched. For each satellite, hypotheses for three different Doppler frequencies, 15 code phase candidates are done with ¼ chip accuracy. As described, the multiplexing for the hypotheses can be properly distributed to be adaptable for the application mode under the fixed clock rate. Such a manner is referred to as "fix-rate-adaptive-domain".

However, in practice, sometimes there is no need to search a range of 15 hypotheses in code phase domain, and there is no need to search at three different Doppler frequencies. In addition, sometimes it is not necessary to search so many satellites. If such unnecessary trials can be omitted, then power consumption of the receiver can be significantly reduced.

In another case, K is variable. The clock rate is changed for different mode. For example, in satellite searching mode, the receiver needs to acquire satellites as soon as possible. Therefore, a higher clock rate is recommended. In satellite tracking mode, a lower clock rate can be used to reduce power consumption. Such a manner is referred to as "adaptive-rate-adaptive-domain".

Figure 1:
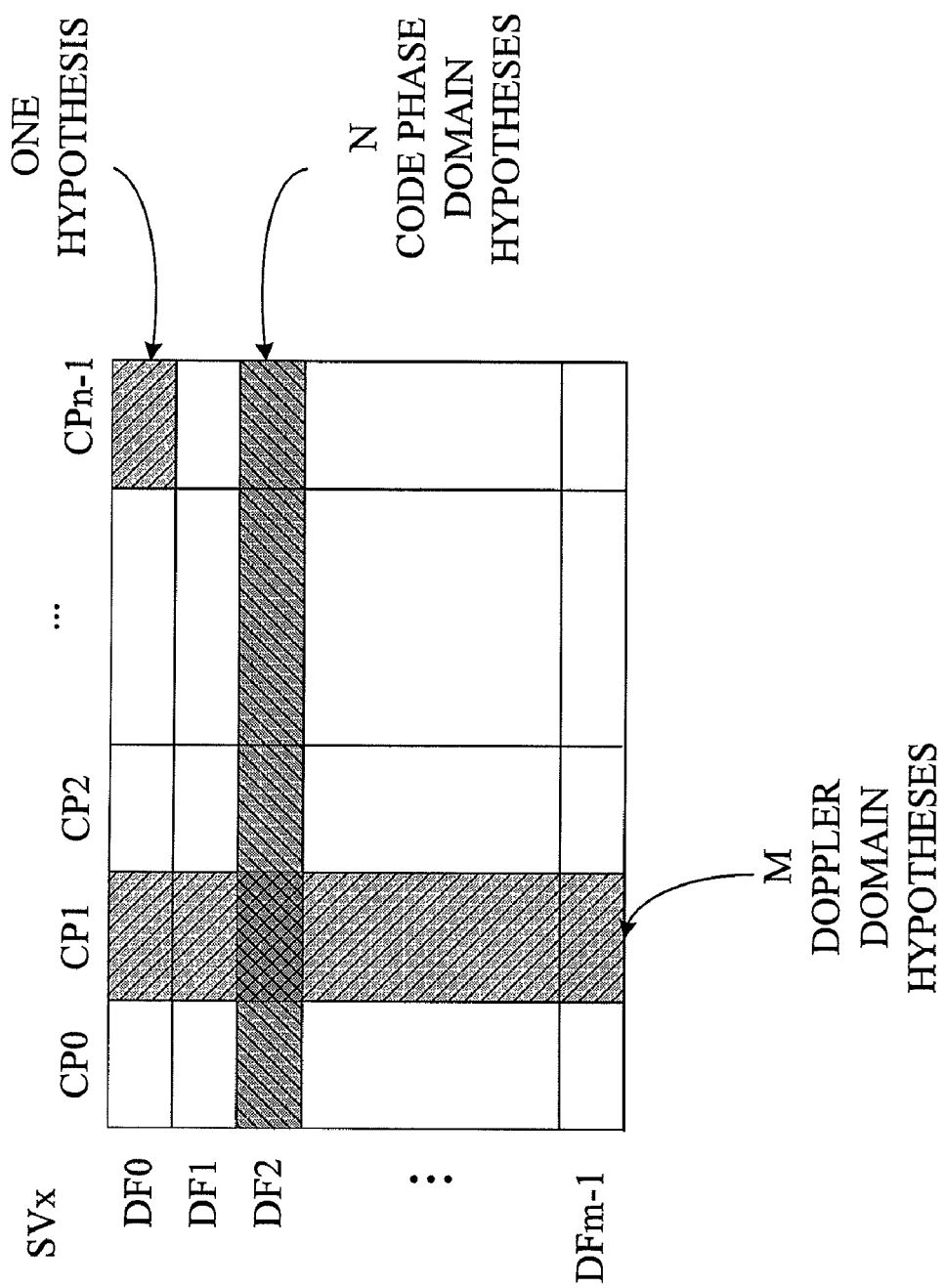
FIG. 1 schematically shows hypotheses in code phase domain and Doppler frequency domain for a specific satellite.
Figure 3:
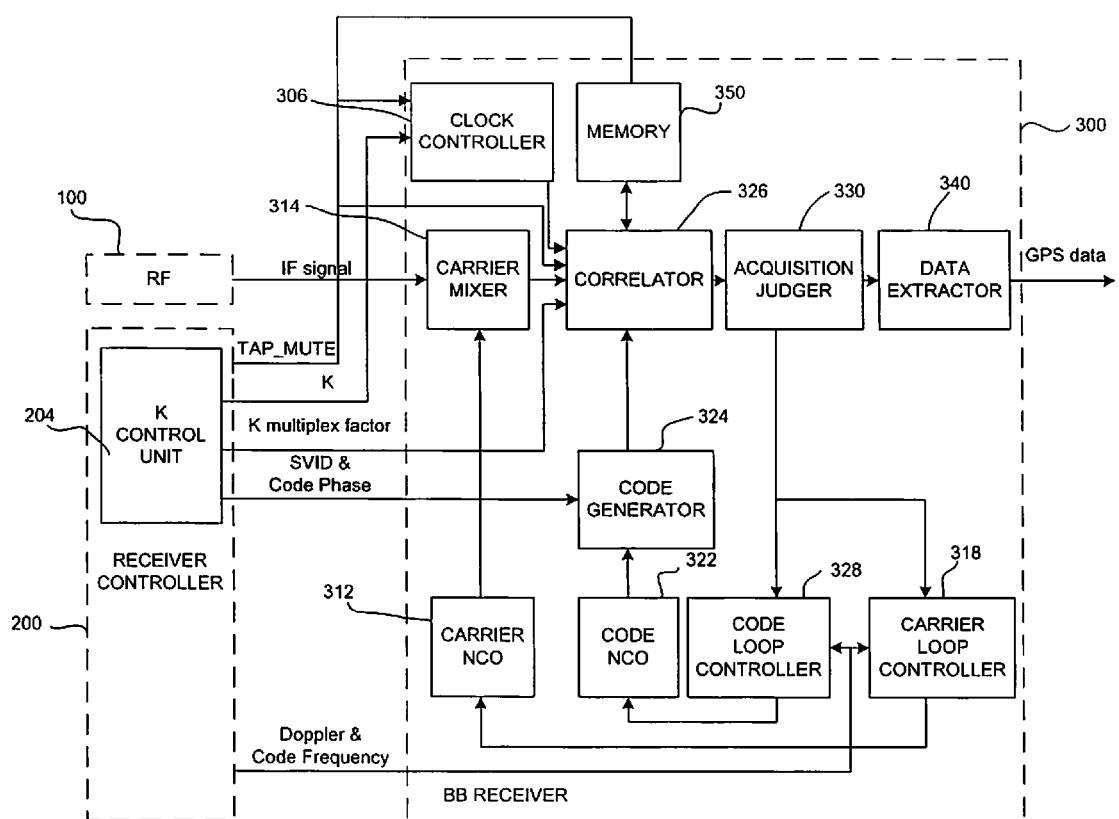
FIG. 3 is a block diagram showing a GNSS receiver in accordance with the present invention.

FIG. 3 is a block diagram showing a structure of a GNSS receiving device, which comprises a baseband receiver in accordance with the present invention. The adaptive-rate-adaptive-domain scheme can be described with reference to this drawing. As shown, the receiving device includes an RF receiver 100, in which all RF related processes are done, a receiver controller 200 and a baseband (BB) receiver 300. The RF receiver 100 receives a GNSS (e.g. GPS) signal, which is spread coded, and converts the signal to an intermediate frequency (IF) signal. The IF signal is output to the baseband receiver 300. The operations thereof will be described in detail later.

The IF signal is transmitted to a carrier mixer 314 of the baseband receiver 300. The carrier mixer 314 mixes the IF signal with a carrier signal generated from a carrier NCO (numerical controlled oscillator) 312 to convert the IF signal to a baseband signal. A code generator 324 using a code clock generated by a code NCO 322 to generate pseudo-random noise (PN) code signal. A clock signal with a clock rate K is provided. A correlator 326 executes correlation to the signal according to the clock signal. The provision of K can be a resident operation in the receiver. The correlator 326, which comprises a code mixer (not shown) and an accumulator (not shown), mixes the baseband signal with the PN code signal to despread the spread coded signal and integrates the mixed result. That is, the correlator 326 executed correlation to the baseband signal. Before correlation, the correlator 326 receives an instruction concerning the distribution of K, which has been introduced above, and executes correlation according to the instruction. This instruction, which is referred to K multiplex factor, is issued by a K control unit 204. The K multiplex factor will be further described later. This K control unit 204 can be built in the receiver controller 200 or externally provided in a hardware, firmware or software form. In the present embodiment, the K control unit 204 is set in the receiver controller 200. The integrated result of the correlator 326 is stored in a memory 350. An acquisition judger 330 determines if an acquisition is achieved according to the output of the correlator 326. If the acquisition is achieved, the acquisition judger 330 starts signal tracking. Since the searching speed is not necessary to be so fast in the tracking mode, the clock rate K can be lowered down. In addition, the ranges of code phase domain and Doppler frequency domains can be narrowed in the tracking mode. Accordingly, the K multiplex factor can be changed to adjust the time-division multiplexing of the correlator 326. The acquisition judger 330 feeds back signals to adjust the carrier NCO 312 and code NCO 322 via a carrier loop controller 318 and a code loop controller 328, respectively, so as to track the signal in code phase domain and Doppler frequency domain. A data extractor 340 is used for extracting data of input signal according to the output of the correlator 326.

The baseband receiver 300 further has a clock controller 306. The clock controller 306 provides the clock with the clock rate K. The clock rate can be fixed or variable. In the case that the clock rate is variable, the clock controller 306 receives a command concerning K value provided by the K control unit 204 to control the clock rate and accordingly the operation speed of the correlator 326.

When the operation mode of the receiver is changed, (e.g. the process enters satellite tracking mode from satellite acquiring mode), the K multiplex factor should be changed to adaptively adjust the time-division multiplexing of the correlator 326. More preferably, the clock rate is also changed, that is, K is changed. In this example, the clock rate K is changed to a lower value when the process enters into signal tracking stage from signal acquisition stage. As mentioned, in satellite searching mode, a higher speed is preferred. Accordingly, a higher clock rate $K_H$ is appropriate. After acquisition, the receiver is to stably track the observable satellites and to save power consumption as much as possible. Accordingly, a lower clock rate $K_L$ is more suitable for this condition.

The higher clock rate $K_H$ used in searching mode can be 2046 as the previous example described in the background to provide a multiplexing such as 1×2×1023×1, or even 4092 to provide a multiplexing as 2×1×1023×2. For tracking mode, the clock rate K can be lowered down to $K_L$, which can be 200 to provide a multiplexing of 11×1×5×4, since it is not necessary to try so many hypotheses in code phase domain, and the Doppler frequency should be known in tracking mode. The clock rate $K_L$ can adaptively vary according to the number of satellites that are being tracked. For example, if there are eight satellites are being tracked, the $K_L$ can be lowered down to 160 to provide a multiplexing of 8×1×5×4. Similarly, if there are only five satellites are being tracked, the $K_L$ can be further lowered down to 100 to provide a multiplexing of 5×1×5×4. The instruction to indicate various multiplexing arrangements of K is the K multiplex factor passed to the correlator 326.

As mentioned, status changes dynamically during satellite acquisition and tracking, for example. In some situations, it is preferred to adaptively change the clock rate, so described above. However, if the clock rate is changed too frequently, it will undesirably consume power. It is uneconomical to change clock rate when there is only a slight change in hypotheses to be tried. For example, in a certain case, a small part of hypotheses to be processed in TDM manner is not necessary to try. That is, only a small portion of TDM operations needs to be idled or a temporary power-down is needed to save power. For example, when the receiver has been acquired satellites and started to track the same, there may be slight changes in various domains such as satellite ID phase (X), Doppler frequency phase (M), code phase (N) and accuracy phase (P).

Figure 4:
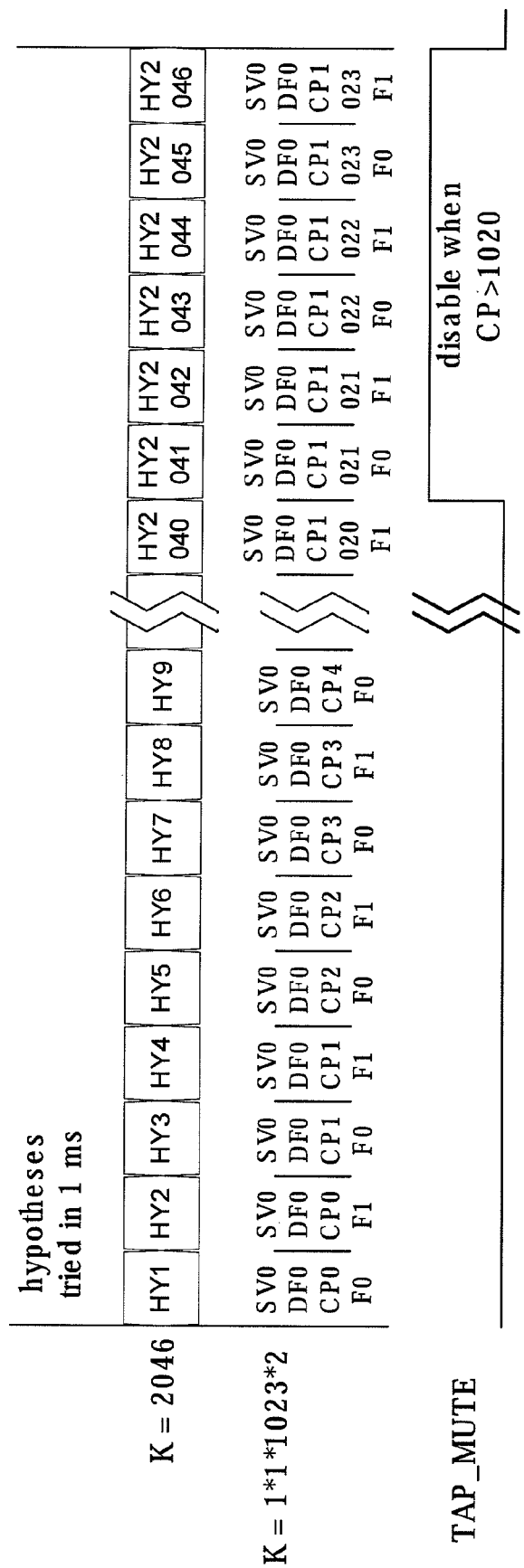
FIG. 4 shows an example where some specific hypotheses are not necessary to be tried.

Assuming X=1, M=1, N=1023 and P=2, FIG. 4 shows an example that the hypotheses for code phases CPn>1020 are not necessary to be tried. Accordingly, the TDM operations for these hypotheses can be disabled. Returning to FIG. 3, in accordance with the present invention, the receiver controller 200 generates a disable signal TAP_MUTE to deactivate some components of the receiver during TDM time slots for CPn>1020 in this case, so that such components are idle during these time slots to save power consumption. In modern GPS or other CDMA receivers, the components consuming the most power are correlator and memory cells. Therefore, in the present embodiment, the disable signal TAP_MUTE is transmitted to the clock controller 306 to turn off a correlator clock, to the memory 350 to pull off a chip-enable signal of the memory, and the correlator 326 to turn off communication logics in the correlator 326. However, the disable signal TAP_MUTE can also sent to other components to deactivate some signals or circuits, so as to reduce power consumption.

Figure 5:
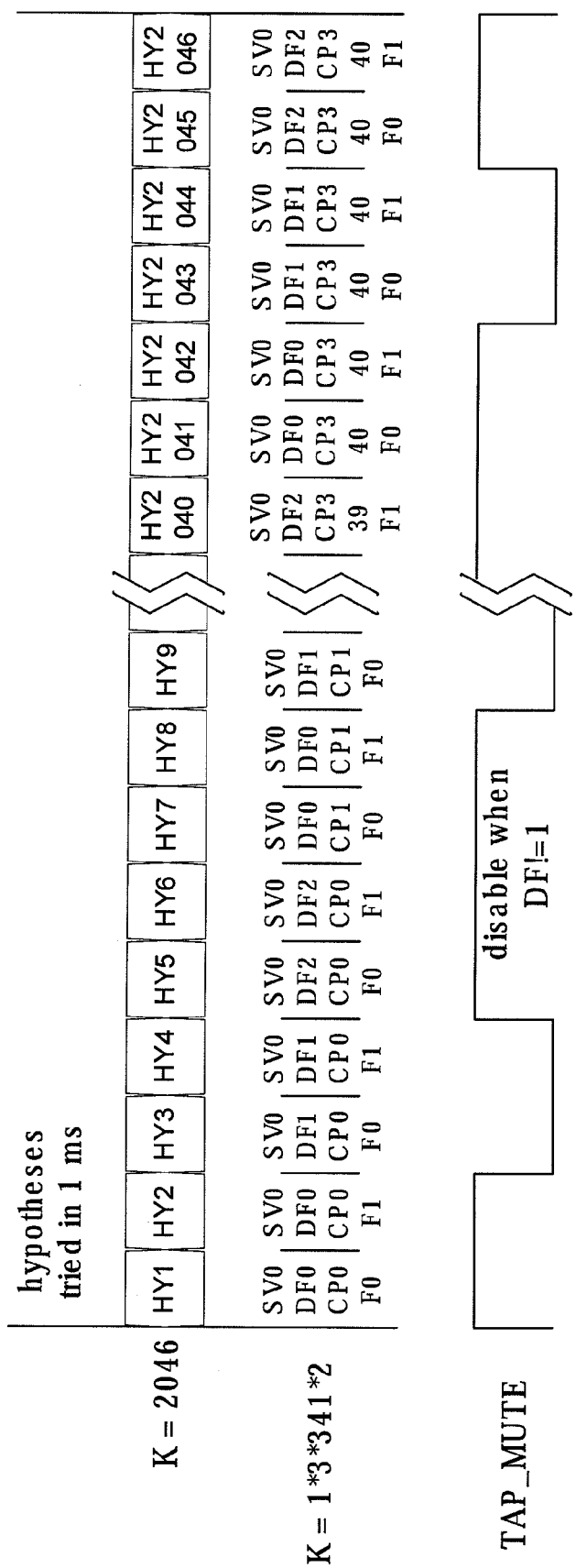
FIG. 5 shows another example where some specific hypotheses are not necessary to be tried.
Figure 6:
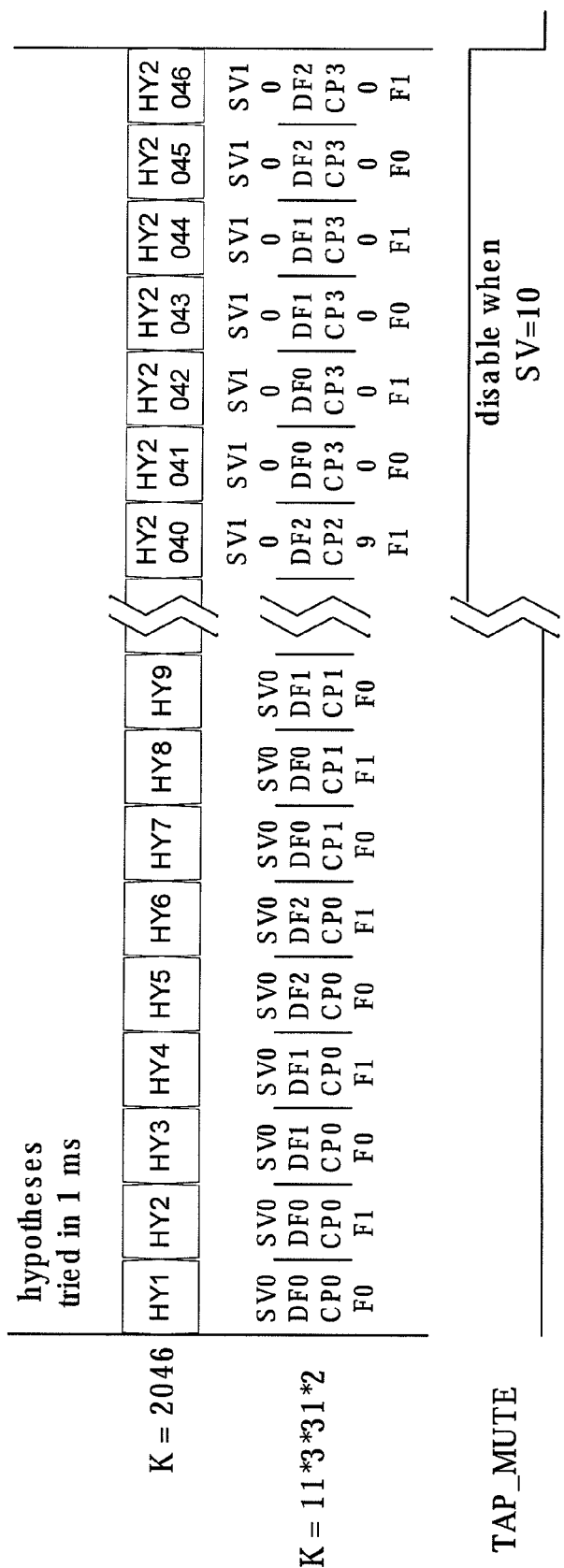
FIG. 6 shows a further example where some specific hypotheses are not necessary to be tried.

FIG. 5 and FIG. 6 respectively show two application examples of the disable signal TAP_MUTE. In the case of FIG. 5, it is assumed that the TDM is distribution as X=1, M=3, N=341 and P=2, a relatively strong and stable satellite signal has been tracked, if only one Doppler frequency beam (DF1) needs to be tried for positioning, then the disable signal TAP_MUTE is generated to deactivate the time slots for DF0 and DF2. That is, some specific hardware components are deactivated during the time slots for Doppler frequency beams other than DF1 by the disable signal TAP_MUTE. Furthermore, if the number of satellites being tracked varies frequently, it is not efficient to change the clock rate continually. The disable signal TAP_MUTE can be generated in correspondence to the tracked satellite number to deactivate the specific hardware components. FIG. 6 shows an example that the TDM distribution is X=11, M=3, N=31 and P=2, the disable signal TAP_MUTE is to deactivate the components when SV=10.

Figure 7:
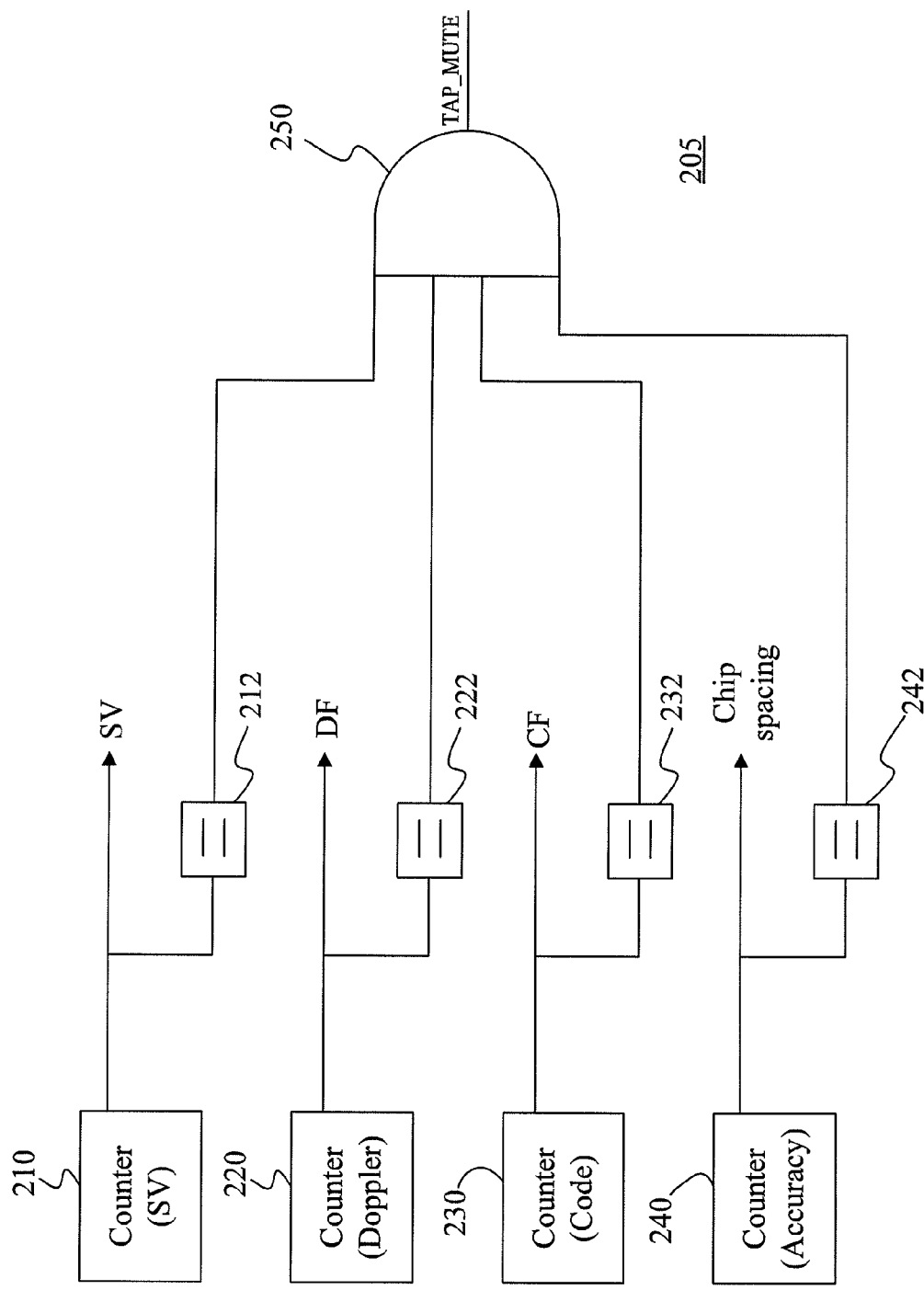
FIG. 7 schematically shows an example of a disable signal generator of FIG. 3.

The disable signal can be generated in any proper manner. FIG. 7 schematically shows an example of a disable signal generator 205, which can be disposed in the receiver controller 200 in FIG. 3. The disable signal generator 205 has four counters 210, 220, 230 and 240. The counter 210 is for satellite number domain, counter 220 is for Doppler frequency domain, counter 230 is for code phase domain and counter 240 is for accuracy domain. Each counter generates a signal according to a condition of the corresponding domain by a generating unit (212, 222, 232, 242 in FIG. 7). The disable signal generator 205 further has a combiner 250 to combine the respective signals from the generating units 212, 222, 232, 242 and generates a resultant disable signal TAP_MUTE.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A satellite signal adaptive time-division multiplexing receiving device comprising:
   a correlator correlating an input signal with a PN code signal in time-division multiplexing time slots to try hypotheses of domains of code phase, Doppler frequency, satellite number and accuracy;
   a memory for storing a correlation result of the correlator; and
   a receiver controller outputting a disable signal to deactivate the correlator during at least one of the time-division multiplexing time slots when a specific prerequisite of the code phase, Doppler frequency, satellite number or accuracy is satisfied.

2. The device of claim 1, wherein multiplexing of the time-division multiplexing time slots for trying the hypotheses in the respective domains is adjustable.

3. The device of claim 1, further comprising a clock controller providing a clock signal with a clock rate, wherein the correlator executes correlation at a speed determined by the clock rate.

4. The device of claim 3, wherein the clock controller changes the clock rate when an operation mode of the receiving device is changed, wherein the operation mode is selected from a satellite acquiring mode and a satellite tracking mode.

5. The device of claim 3, wherein the receiver controller transmits the disable signal to the clock controller to deactivate a clock for the correlator during said at least one of the time-division multiplexing time slots.

6. The device of claim 1, wherein the receiver controller transmits the disable signal to the memory to turn a chip-enable signal of the memory off during said at least one of the time-division multiplexing time slots.

7. The device of claim 1, wherein the disable signal is generated by the receiver controller according to satellite number to be tried.

8. The device of claim 1, wherein the disable signal is generated by the receiver controller according to Doppler frequencies to be tried.

9. The device of claim 1, wherein the disable signal is generated by the receiver controller according to code phases to be tried.

10. The device of claim 1, wherein the disable signal is generated by the receiver controller according to accuracy determined by chip code spacing.

11. The device of claim 1, wherein the receiver controller has a disable signal generator for generating the disable signal, the disable signal generator comprises a plurality of counters, each of which is in charge of one domain so that a signal is generated for the corresponding domain, and a combiner for combining the signals for respective domains to output a resultant disable signal.

12. The device of claim 1, wherein multiplexing of the time-division multiplexing time slots for trying the hypotheses in the respective domains is determined by the receiver controller depending on code phase range to be searched.

13. The device of claim 1, wherein multiplexing of the time-division multiplexing time slots for trying the hypotheses in the respective domains is determined by the receiver controller depending on Doppler frequency range to be searched.

14. The device of claim 1, wherein multiplexing of the time-division multiplexing time slots for trying the hypotheses in the respective domains is determined by the receiver controller depending on satellite number to be searched.

15. The device of claim 1, wherein multiplexing of the time-division multiplexing time slots for trying the hypotheses in the respective domains is determined by the receiver controller depending on tracking accuracy.

* * * * *